United States Patent [19]
Gaultier et al.

[11] Patent Number: 5,680,353
[45] Date of Patent: Oct. 21, 1997

[54] EPROM MEMORY WITH INTERNAL SIGNATURE CONCERNING, IN PARTICULAR, THE PROGRAMMING MODE

[75] Inventors: Jean-Marie Gaultier, Rousset; Bertrand Conan, AIX en Provence; Augustin Farrugia, La Ciotat, all of France

[73] Assignee: SGS-Thomson Microelectronics, S.A., Gentilly Cedex, France

[21] Appl. No.: 116,491

[22] Filed: Sep. 3, 1993

Related U.S. Application Data

[63] Continuation of Ser. No. 659,414, Mar. 7, 1991, abandoned.

[30] Foreign Application Priority Data

Sep. 14, 1988 [FR] France ........................... 88 11997
Sep. 14, 1989 [WO] WIPO .................. PCT/FR89/00466

[51] Int. Cl.[6] .................................................. H01L 29/788
[52] U.S. Cl. ................... 365/200; 365/230.03; 257/315; 257/529; 257/659; 371/21.6
[58] Field of Search ................. 371/21.6; 365/230.03, 365/200; 357/85; 257/315, 529, 659

[56] References Cited

U.S. PATENT DOCUMENTS

| | | | |
|---|---|---|---|
| 4,055,802 | 10/1977 | Panousis et al. | 324/73 AT |
| 4,217,637 | 8/1980 | Faulkner | 364/200 |
| 4,759,123 | 7/1988 | Ohta et al. | 357/85 |
| 4,942,450 | 7/1990 | Iwashita | 357/23.5 |
| 4,998,223 | 3/1991 | Akaoji | 365/230.03 |

FOREIGN PATENT DOCUMENTS

| | | |
|---|---|---|
| 0115565 | 8/1984 | European Pat. Off. . |
| 0129054 | 12/1984 | European Pat. Off. . |
| 2608317 | 6/1988 | France . |
| 2840305 | 3/1980 | Germany . |

OTHER PUBLICATIONS

Kugler et al IBM Tech Discl. Bulletin, vol. 22, No. 5, Oct. 1979, pp. 1879–1880.

*Primary Examiner*—Ngân V. Ngô
*Attorney, Agent, or Firm*—Robert Groover; Betty Formby; Matthew Anderson

[57] ABSTRACT

Electrically programmable memories, in particular EPROMs, generally have an internal signature which can be read by the memory-programming device. This internal signature indicates the origin of the part (manufacturer's identification) and the appropriate programming mode for the part (fast programming, "intelligent" programming, etc.). Here, it is proposed that this information be recorded in a UPROM (unerasable programmable read-only) memory, i.e., in practice an EPROM memory masked by a layer of aluminium which prevents its erasure by ultraviolet rays.

29 Claims, No Drawings

EPROM MEMORY WITH INTERNAL SIGNATURE CONCERNING, IN PARTICULAR, THE PROGRAMMING MODE

This is a continuation of application Ser. No. 07/659,414, filed Mar. 07, 1991, now abandoned.

The invention concerns electrically programmable memories and, more particularly, what are called EPROMs (electrically programmable read-only memories).

These memories are generally manufactured and sold in a blank state, i.e. without any information recorded in the memory. They are delivered to a user who will himself program them according to his requirements or will have them programmed by a specialised firm. By the programming of a memory we mean, herein, the recording of data in the memory.

The programming machine should be capable of receiving memories of different origins (from different manufacturers), but also of different types when they are memories of the same origin.

This is why, to facilitate the management of the components to be programmed by the machines, it is generally provided that the components will contain a piece of information, firstly on their origin (manufacturer's identification for example, or even the identification of the manufactured batch) and secondly on their type.

In practice, there is provision for a piece of information on an eight-bit word for the identification of the origin, and an piece of information in the form of an eight-bit word for the type of memory.

These pieces of information are contained in the integrated circuit in the form of an internal electronic circuit, said circuit having a different configuration according to the pieces of information to be provided.

Usually, it is by the choice of appropriate connections in this circuit that the information to be transmitted to the programming machine is defined. These connections may be set up by an etched metal layer. The etching pattern therefore defines the desired information on the origin and the type of the memory. However, the information may be defined by other means of configuration of a circuit within the integrated circuit chip containing the EPROM. For example, the configuration may be defined on the basis of an impurities implantation mask or by the presence or absence of transistors. Generally, this information is, in any case, a piece of information obtained in the form of a fixed configuration of the circuit internal to the chip, this configuration being obtained during the manufacturing process. A structure such as this is, for example described in the patent U.S. Pat. No. 4,055,802. It is possible, in effect, in order to customize a circuit, to set up connections as required between different points of this circuit before the end of the manufacturing process.

When the component to be programmed is introduced into the programming machine, the machine tests the component to read therein the information contained on the origin and type of the memory. And it performs the programming as a function of this piece of information.

This system works very well and has many advantages: the desired information is recorded definitively since it is contained in the form of a well-defined pattern of a portion of a manufactured layer of the integrated circuit; it can therefore be of use again during a subsequent programming of the memory (if the memory is programmed several times, which is possible with EPROMs erasable by ultraviolet rays); furthermore, the information can be placed in the component at a late stage of manufacture should the metallisation level be used to encode the information. The metallisation level is, in effect, one of the very last levels for which the masking operations are planned. The result thereof is that components of different types may follow the same production lines up to the end; only a later step will be different according to the different types.

It has been realised however that, while this system is very efficient as regards the information on the origin of the component, it has drawbacks as regards the information on the type of memory.

To provide an understanding of these drawbacks, we shall give an example of the case where the information on the type of memory concerned is a piece of information on the programming mode that must be used to program this memory. However, drawbacks exist also if the piece of information pertains more generally to the performance characteristics of the memory.

The memory may be programmed, for example, according to two programming modes which are a so-called "fast" programming mode and a so-called "intelligent" programming mode. In the "fast" programming mode, it is attempted to program each memory cell in a short period by a single voltage pulse which is calibrated in the same way for all the cells; then a check is made; if the programming is insufficient, the operation is recommenced; it is possible to recommence it only a certain number of times. In the "intelligent" programming mode, a programming pulse is applied to a cell, after which it is ascertained that the programming is sufficient; if this is not so, the operation is recommenced; when the programming becomes sufficient, the reprogramming is done again for a duration which is thrice as long as the total previous programming time. Fast programming has the advantage, as its name indicates, of being faster, but it is less reliable in principle. Consequently, its use is acceptable only for components that have been manufactured by a technology with greater reliability, for it is then possible to be reasonably sure that the fast programming will work accurately.

The components containing the "fast programming" information will be recognised by the programming machine as having to be programmed according to the "fast" mode, and the components containing the "intelligent programming" information will be recognised as having to be programmed according to the "intelligent" mode.

However, the manufacturer, who sends his blank components to the user or to the programming firm, tests them before sending them. And, among the tests performed, some tests make it possible to perceive the fact that components which theoretically have the capacity to be programmed in the "fast" mode do not actually have this capacity. It proves to be the case, after manufacturing and final testing, that the components have to be downgraded because they can be programmed in practice only through an "intelligent" programming mode.

Since these components have a "fast programming" signature, they will be recognised by the programming machine as having to be programmed by the "fast" mode. There is a de facto incompatibility between the internal information in the component and the real characteristics of the component. The components have to be discarded.

To circumvent this drawback without going back on the main principle of the fixed nature of the marking of the components, as regards the origin and type of the component, it is proposed, according to the invention, to mark the components only after the final test, the marking being constituted by a piece of information recorded in an unerasable and programmable element, this element being capable of being programmed after the final testing of the integrated circuit. The information is therefore recorded in a special auxiliary memory which may be formed by a so-called UPROM memory; a UPROM memory is, for example, an EPROM masked by a metal layer preventing its erasure by ultraviolet rays.

Consequently, according to the invention, it is proposed to incorporate, in a main EPROM memory, an auxiliary circuit including a special memory that is programmable after the final test and is unerasable, notably a UPROM memory. This memory is accessible in reading mode and in writing mode by the input/output pads of the integrated circuit chip containing the EPROM memory. The access is achieved, however, by means of configurations that are barred to the customer using the integrated circuit. The EPROM memory is tested at the end of manufacture. Depending on the results of the test, a piece of information is recorded by the testing apparatus in the special memory of the auxiliary circuit to indicate the appropriate type of programming; it is also possible to record a piece of information on the origin of the component in the special memory if this is desired, rather than defining the origin by means of a fixed configuration of the circuit (a particular pattern of interconnections in the last metallisation level of the chip, or another means). The UPROM memory may be replaced, if necessary, by fuses.

The programming machine will include means to read the information contained in the special memory before proceeding with the programming, in the same way as if the information were to be defined by a circuit with a fixed configuration.

When the manufacturer tests the component before dispatching it to the customer or to the programming firm, he makes a recording, in the special memory (UPROM), of the appropriate pieces of information compatible with the results of the test: if the test indicates that, despite expectations, the memory ought not to be programmed according to a fast algorithm, a corresponding piece of information will be indicated in the UPROM memory and the component will not be discarded.

The information contained in the special memory is indelible and, in particular, this piece of information can no longer be erased by ultraviolet rays being used to erase the EPROM memory. Preferably, it might also be provided that the access, in writing mode, to the special memory is prevented, for example by the burning of a fuse or the programming, in the special memory, of a prohibition bit, after the recording of the data has been done by the manufacturer.

We claim:

1. A method of providing information with regard to an appropriate mode of programming of an electrically programmable main floating-gate memory made in integrated circuit form on an integrated circuit chip, which method comprises:

storing on said chip, contemporaneously with the fabrication thereof, bits indicating at least one permissible mode of operation of said main memory;

testing said main memory, such testing including determination of whether said chip is operative, and also determination of an appropriate one of a plurality of different types of programming for said main memory;

after the completion of testing of said main memory, recording information derived from said testing operation, including bits which indicate at least one permissible mode of operation of said main memory, in a special auxiliary memory which is part of said integrated circuit chip, said auxiliary memory being an unerasable and programmable element which is readable through contact pads of said chip, said information indicating which of said types of programming which should be used with said main memory as determined by said testing, and at a time of programming said integrated circuit in the field, reading said information in said auxiliary memory to determine which of said types of programming to use, and programming said main memory accordingly with the indicated type of programming.

2. A method in accordance with claim 1 wherein said information includes one of (a) an indication that said main memory has the capacity to be programmed in the "fast" mode, and (b) an indication that said main memory should be programmed in the "intelligent" mode.

3. A method in accordance with claim 1 wherein said main memory is a main EPROM memory.

4. A method in accordance with claim 1 further comprising providing additional information in said integrated-circuit chip, such additional information being an identification of the origin of said integrated circuit chip.

5. A method in accordance with claim 4 wherein said additional information is provided in the form of an internal electronic circuit in said integrated circuit chip.

6. A method in accordance with claim 5 wherein said internal electronic circuit is a fixed configuration of a circuit internal to said integrated circuit chip.

7. A method in accordance with claim 5 wherein said internal electronic circuit is defined by an etched metal layer in said integrated circuit chip.

8. A method in accordance with claim 1 wherein said auxiliary memory is a unerasable programmable read-only memory.

9. A method in accordance with claim 1 wherein said auxiliary memory is an EPROM masked by a metal layer to prevent its erasure by ultraviolet rays.

10. A method in accordance with claim 1 further comprising accessing said auxiliary memory in the reading mode and in the writing mode via the input/output pads of said integrated circuit chip.

11. A method in accordance with claim 10 further comprising baring access to said auxiliary memory in writing mode after said information is recorded in said auxiliary memory.

12. A method in accordance with claim 10 further comprising baring access to said auxiliary memory in writing mode by burning a fuse after said information is recorded in said auxiliary memory.

13. A method in accordance with claim 10 further comprising baring access to said auxiliary memory in writing mode by programming a prohibition bit in the auxiliary memory after said information is recorded in said auxiliary memory.

14. A method in accordance with claim 1 wherein said information includes one of (a) an indication that said main memory has the capacity to be programmed in the "fast" mode, and (b) an indication that said main memory should be programmed in the "intelligent" mode; wherein said main memory is a main EPROM memory; and wherein said auxiliary memory is a unerasable programmable read-only memory.

15. A method in accordance with claim 14 further comprising baring access to said auxiliary memory in writing mode after said information is recorded in said auxiliary memory.

16. A method of programming an integrated circuit, comprising:

providing an integrated circuit containing a main floating-gate memory which is programmable and erasable and an auxiliary memory which is unerasable;

testing said integrated circuit, such testing including determination of whether said chip is operative, and also determination of the appropriate type of programming for said main memory, and thereafter writing a programming indicator to said auxiliary memory, in accordance with the results of said testing, which indicates the programming mode to use on said main memory; and writing data to said integrated circuit, in the field, by a programming method which is selected from a group of programming methods in accordance with said programming indicator.

17. A method as in claim 16, wherein said integrated circuit comprises EPROMs erasable by UV light.

18. A method as in claim 16, wherein said programming methods include "fast" programming and "intelligent" programming.

19. A method as in claim 16, wherein said main memory is a main EPROM memory.

20. A method as in claim 16, further comprising writing additional information in said integrated circuit, said additional information being an identification of the origin of said integrated circuit.

21. A method as in claim 6, further comprising barring access to said auxiliary memory in writing mode by burning a fuse after said information is recorded in said auxiliary memory.

22. A method as in claim 16 further comprising barring access to said auxiliary memory in writing mode by programming a prohibition bit in the auxiliary memory after said information is recorded in said auxiliary memory.

23. A method of programming an integrated circuit, comprising:

providing an integrated circuit containing a main floating-gate memory which is programmable and erasable and an auxiliary memory which is unerasable;

testing said integrated circuit, such testing including determination of whether said chip is operative, and also determination of the appropriate type of programming for said main memory, and thereafter writing a programming indicator to said auxiliary memory, in accordance with the results of said testing, which indicates the programming mode to use on said main memory; and when writing is desired, after the integrated circuit is packaged, writing data to said integrated circuit by a programming method which is selected from a group of programming methods in accordance with said programming indicator.

24. A method as in claim 23, wherein said integrated circuit comprises EPROMs erasable by UV light.

25. A method as in claim 23, wherein said programming methods of said group include "fast" programming and "intelligent" programming.

26. A method as in claim 23, wherein said main memory is a main EPROM memory.

27. A method as in claim 23, further comprising writing additional information in said integrated circuit, said additional information being an identification of the origin of said integrated circuit.

28. A method as in claim 23, further comprising barring access to said auxiliary memory in writing mode by burning a fuse after said information is recorded in said auxiliary memory.

29. A method as in claim 23, further comprising barring access to said auxiliary memory in writing mode by programming a prohibition bit in the auxiliary memory after said information is recorded in said auxiliary memory.

* * * * *